(12) United States Patent
Flamang et al.

(10) Patent No.: US 7,255,537 B2
(45) Date of Patent: Aug. 14, 2007

(54) WIND TURBINE GEAR UNIT WITH INTEGRATED ROTOR BEARING

(75) Inventors: Peter Flamang, Bonheiden (BE); Warren Smook, Overijse (BE); Roger Bogaert, Dendermonde (BE)

(73) Assignee: Hansen Transmissions International, N.V., Edegem (BE)

( * ) Notice: Subject to any disclaimer, the term of this patent is extended or adjusted under 35 U.S.C. 154(b) by 77 days.

(21) Appl. No.: 10/535,428

(22) PCT Filed: Nov. 18, 2003

(86) PCT No.: PCT/IB03/06317

§ 371 (c)(1),
(2), (4) Date: May 19, 2005

(87) PCT Pub. No.: WO2004/046582

PCT Pub. Date: Jun. 3, 2004

(65) Prior Publication Data

US 2006/0052200 A1    Mar. 9, 2006

(30) Foreign Application Priority Data

Nov. 19, 2002 (GB) ................................ 0226940.5

(51) Int. Cl.
*F03D 11/02* (2006.01)
*F01D 25/16* (2006.01)

(52) U.S. Cl. ................................. 416/170 R

(58) Field of Classification Search ................. 415/4.3, 415/4.4, 4.5, 70, 124.1; 416/170 R
See application file for complete search history.

(56) References Cited

U.S. PATENT DOCUMENTS

| 3,338,584 A | 8/1967 | Nakanishi et al. |
| 4,183,266 A * | 1/1980 | Osumi ................. 475/337 |
| 6,459,165 B1 * | 10/2002 | Schoo ................. 290/1 C |

FOREIGN PATENT DOCUMENTS

| WO | WO 96/11338 | 4/1996 |
| WO | WO 01/57415 | 8/2001 |
| WO | WO 02/14690 | 2/2002 |
| WO | WO 02/079644 | 10/2002 |
| WO | WO 03/031811 | 4/2003 |

* cited by examiner

*Primary Examiner*—Edward K. Look
*Assistant Examiner*—Devin Hanan
(74) *Attorney, Agent, or Firm*—Young & Thompson

(57) ABSTRACT

In a gear unit for use in wind turbines and of the kind with a planetary gear stage, and an integrated main rotor bearing that is adapted to provide location for the rotor hub relative to the wind turbine nacelle and to locate the planet carrier relative to a low speed ring gear, the forces due to bending moments acting between the rotor hub and nacelle are transmitted substantially directly from the rotor hub to the nacelle via the main bearing and substantially none of the bending moments are transmitted to the nacelle via the ring gear of the planetary gear stage.

16 Claims, 3 Drawing Sheets

WIND TURBINE GEAR UNIT WITH INTEGRATED ROTOR BEARING

This invention relates to a wind turbine gear unit with integrated rotor bearing and in particular, though not exclusively, to a wind turbine gear unit of the kind comprising a planetary gear stage.

Advantages of wind turbine gear units with integrated rotor bearings include low weight and fewer parts. Issues to solve are rotor to nacelle load paths that pass through different components of the gear unit (and may influence it's functionality) and serviceability (and/or replaceability) of some of the gear unit parts including the main bearing and sealing system.

The invention described herein seeks to provide at least some of the advantages typical to integrated rotor bearing designs while offering solutions to some of the disadvantages linked to such designs.

In accordance with one of its aspects the present invention provides a gear unit for use in wind turbines of the kind having an integrated main rotor bearing and comprising a planetary gear stage, said integrated main rotor bearing being adapted to provide location for the rotor hub relative to the wind turbine nacelle and to locate the planet carrier relative to a low speed ring gear, wherein forces due to bending moments acting between the rotor hub and nacelle are transmitted substantially directly from the rotor hub to the nacelle via the main bearing and substantially none of said bending moments are transmitted to the nacelle via the ring gear of the planetary gear stage.

The invention further teaches that preferably also no part of the planet carrier which is substantially in the same axial plane as a plane containing the planet gears transmits any said bending movements to the nacelle.

The invention teaches that preferably the outer ring(s) of the main rotor bearing is secured to the nacelle and that the rotor hub and planet carrier are secured to the inner ring(s) of the main bearing. Accordingly the main bearing serves two functions; firstly it serves as the rotor bearing and secondly it supports the planet carrier. In its role as rotor bearing it acts to transfer substantially all rotor forces and moments (but not driving torque) to the nacelle structure. Mounting the main bearing with the inner ring(s) thereof supporting the planet carrier and fastening the outer ring(s) of the bearing directly to the nacelle (optionally via a main bearing cover or intermediate housing structure), results in the rotor forces and moments being transferred substantially directly to the nacelle via the main bearing.

The main bearing may be of a double taper roller bearing, for example arranged in an O configuration and having a split inner ring, but other types of main bearing such as those comprising cylindrical bearings may be employed.

The ring gear of the planetary gear stage may be secured to the nacelle via an intermediate housing structure. That intermediate housing structure may be secured directly to the nacelle or to the outer ring(s) of the main bearing.

Preferably the planet gears lie axially displaced relative to the main bearing as considered in the direction of the axis about which the planet carrier rotates. Thus the main bearing is not in the same axial plane as the planet gears. In addition to the main bearing being axially offset from the planet gears, the main bearing and/or the ring gear may be axially offset from that part of the nacelle to which they may be secured.

It is further preferred that the sun gear is of the type known as a floating sun gear which is able to move slightly in a direction perpendicular relative to its axis of rotation so as always to lie centrally of the planet gears and ensure that torque is transmitted substantially equally by each of the planet gears.

Preferably the ring gear of the planetary gear stage is selectively releasably secured relative to the nacelle. In consequence all parts of the gear unit except for the planet carrier and main bearing may be dismounted without the need to remove the rotor. (For this purpose it is taught that the planet carrier may be of a two part construction whereby one part of the planet carrier which supports the planet bearings and planet gears may be selectively removed from a second part of the planet carrier which is secured to the main bearing (e.g. the inner ring(s) of the main bearing).

The invention further teaches that the main bearing has an inner diameter less than the outer diameter of the ring gear. Thus during assembly it is not possible for the main bearing to be moved axially over the ring gear, but that is compensated by resulting advantages in respect of the main bearing as compared with one of a larger diameter through which the ring gear may be moved axially. More particularly it is preferred that the inner ring bearing surface of the main bearing has a diameter less than that of the toothed surface of the ring gear.

The invention further teaches that the main bearing may be provided with a seal pack to inhibit leakage of lubricant from the main bearing, and that the seal pack may be selectively removable insitu from the main bearing. The seal pack may be releasably secured to an inner or outer ring of the main bearing and may be arranged to be displaceable axially such that replaceable seals of the seal pack may be inspected and if necessary replaced. Preferably use is made of a seal pack which is secured to the nacelle, i.e. is non rotatable, in which case the seals may be of a split type with the split in the seal(s) being positioned at an uppermost position at which there is no substantial risk of lubricant leaking through the split.

Embodiments of the invention will now be described, by way of example only, with the reference to the accompanying diagrammatic drawings in which:—

Figure 1:
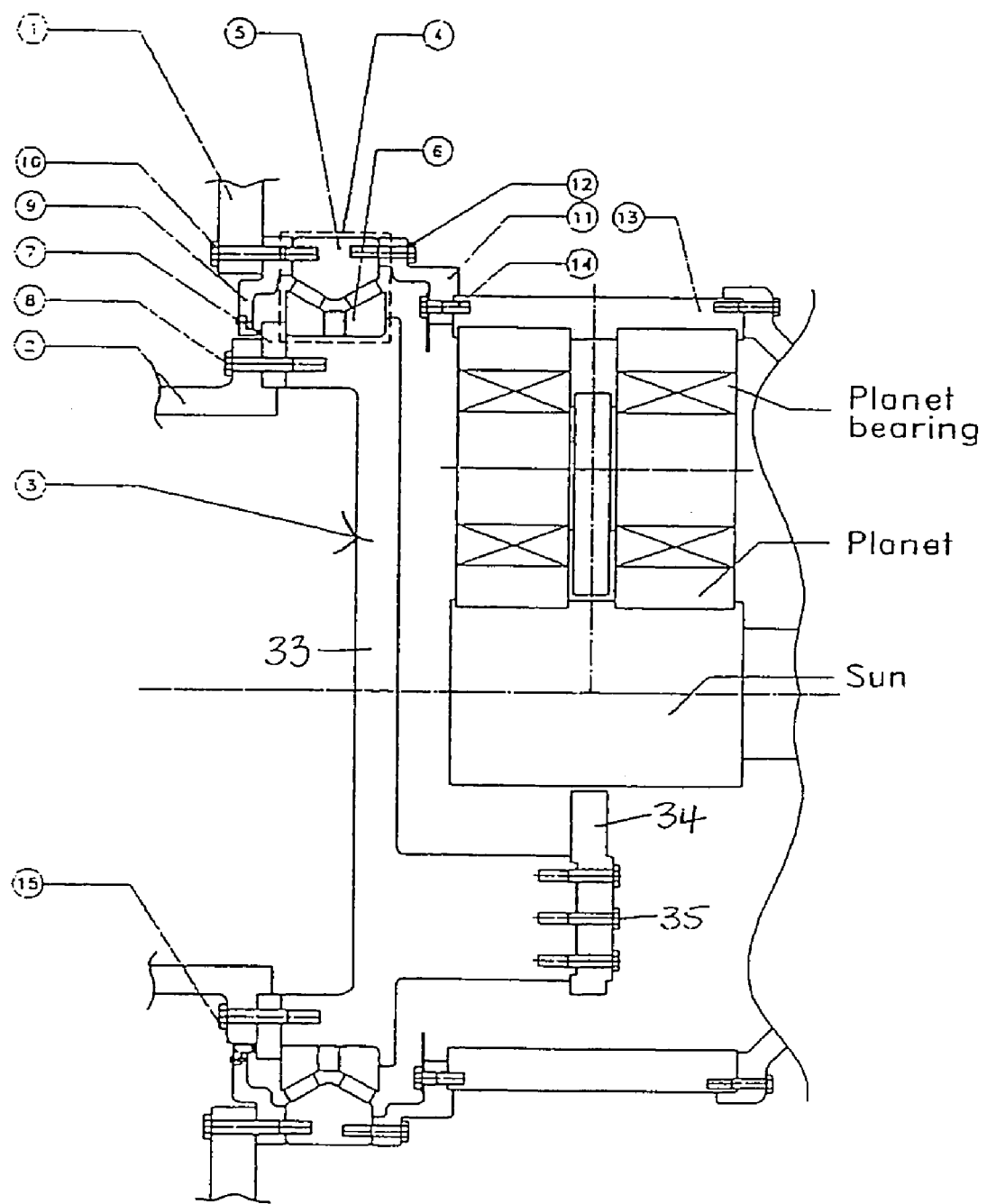
FIG. 1 is a sectional view of a wind turbine gear unit in accordance with a first embodiment of the invention.

In accordance with a first embodiment of the invention FIG. 1 shows a gear unit installed in a wind turbine nacelle [1] with the rotor hub [2] attached directly to the low speed planet carrier [3] of the gear unit. The main bearing [4], which locates the rotor hub relatively to the nacelle as well as the planet carrier relative to the ring gear [13] of the gear unit, is mounted on the planet carrier.

The two inner rings [6] of the main bearing may be located by the retainer ring [7] which is in turn located between the rotor hub and planet carrier. In this embodiment the rotor bolts [8] pass through the retainer ring into threaded holes in the planet carrier.

The gear unit is attached to the nacelle with bolts [10] that pass through the main bearing cover [9] into threaded holes in the outer ring(s) [5] of the main bearing. An intermediate housing [11] is connected to the stationary outer ring(s) of the main bearing with bolts [12]. The threaded holes for these bolts may be either in the outer ring(s) of the main bearing or the main bearing cover. The intermediate housing serves to connect the rest of the gear unit to the stationary structure. This could be done by fastening it to the ring wheel [13] with bolts [14].

The low speed planet carrier [3] is of a two part construction comprising a first part [33] secured to the main bearing inner rings and second part [34] which carries the planet gear bogies and bearings, with the second part [34] being selectively releasable from the first part [33] by removing the retention bolts [35]. The planet carrier comprises three bogie units substantially uniformly circumferentially spaced about the axis of rotation of the planet carrier, and three groups of retention bolts [35] are provided at three circumferentially spaced positions intermediate the planet bogies.

Oil used to lubricate the main bearing is kept from leaking out of the unit by the seal pack [15]. The seal pack may consist of a removable seal holder that could be formed to create a labyrinth and carry a radial lip seal(s), V-ring(s) or a combination of both. The seal lips may rub against the retainer ring [7], the main bearing inner ring(s) [6] or a combination of both.

Before the gear unit is installed in the wind turbine, the retainer ring [7] and main bearing cover [9] are held in place by bolts (not shown in FIG. 1) that are installed as to not interfere with the mating faces of the nacelle [1] and rotor [3] function is taken over by bolts [8] and [10].

Figure 2:
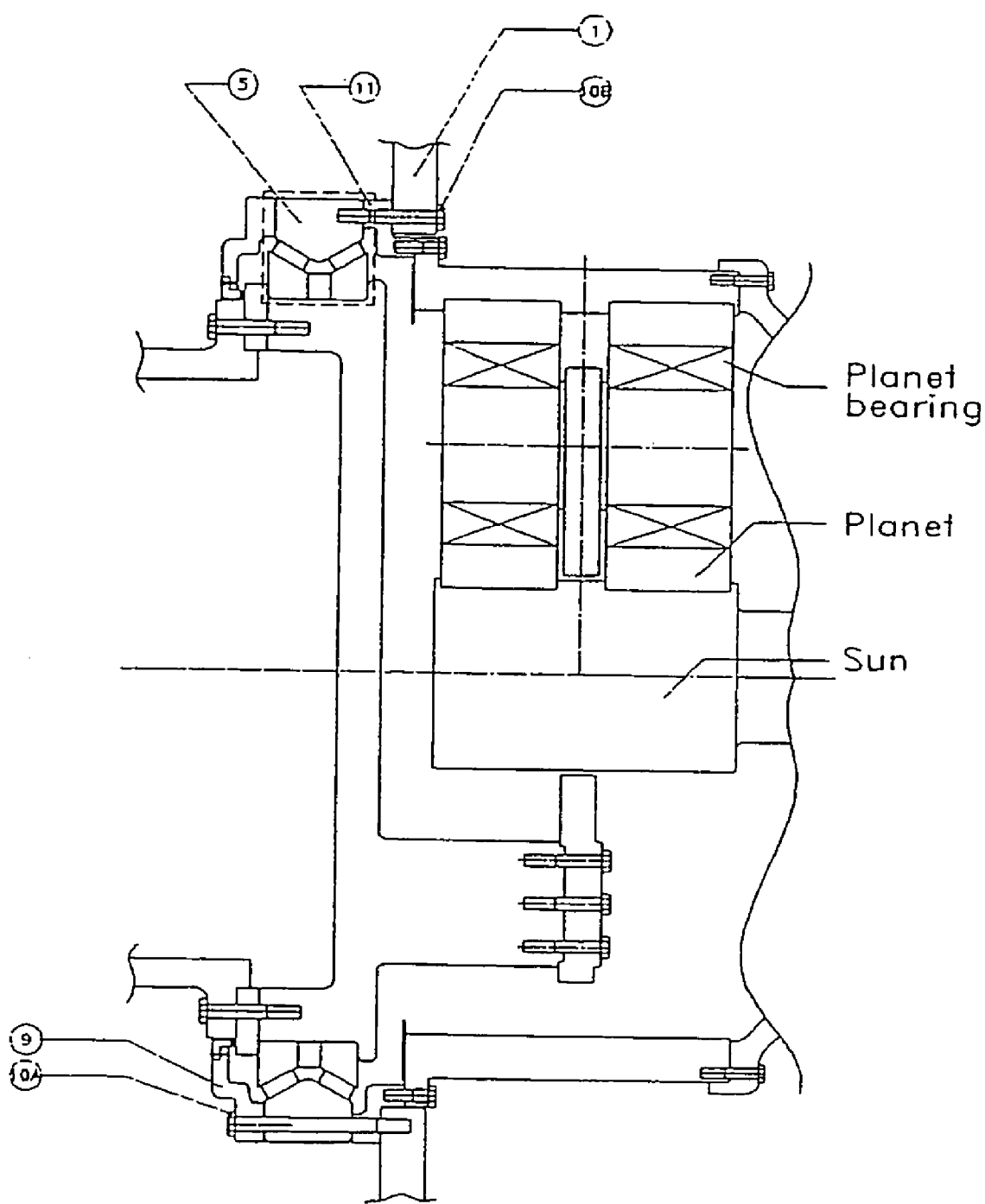
FIG. 2 is a view similar to that of FIG. 1 in accordance with a second embodiment of the invention.

FIG. 2 shows a second embodiment of the invention. In this embodiment the outer ring(s) [5] of the main bearing is mounted to the nacelle structure [1] via the intermediate housing [11]. This could be done by using long bolts [10A] that pass through the main bearing cover [9], the main bearing outer ring(s) [5] and intermediate housing [11] into threaded holes in the nacelle structure. Alternatively the gear unit could be bolted to the nacelle structure using bolts [10B] that are inserted from inside the nacelle, pass through the intermediate housing [11] and into threaded holes in the outer ring(s) of the main bearing.

In this case the intermediate housing [11] and the main bearing cover [9] are held in place by bolts (not shown in FIG. 2) until the unit is installed in the wind turbine at which time their function is transferred to bolts [8] and [10A] or [10B].

Figure 3:
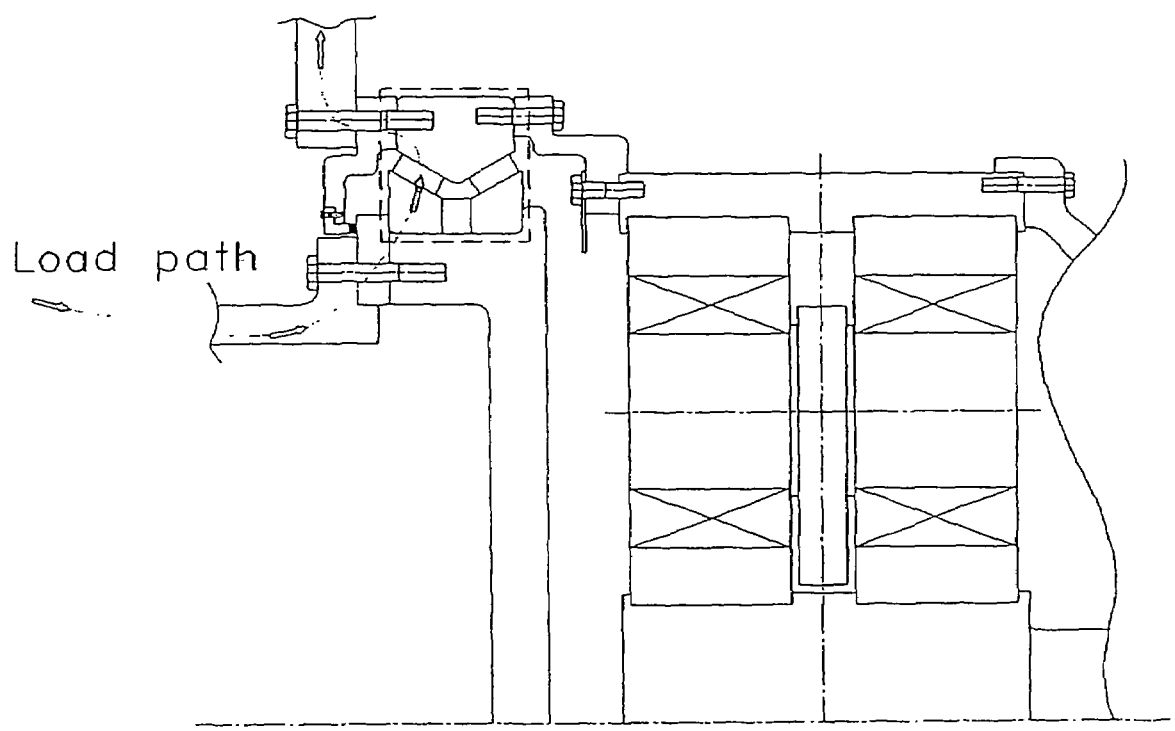
FIG. 3 shows in cross section part of the embodiment of FIG. 1 with the bending moment force transmission path illustrated.

In accordance with the present invention the main bearing serves as a bearing for rotation of the rotor hub relative to the nacelle and also provides support for the planet carrier of the planet gear stage. In the aforedescribed embodiments this is obtained by securing the rotor hub and planet carrier relative to the inner ring of the main bearing whereas the ring gear of the planetary gear is secured relative to the nacelle, either directly or via the outer ring of the main bearing. Accordingly the main bearing is able to transfer all axial and bending moment forces substantially directly to the nacelle structure, and the planetary gear stage experiences substantially only the drive torque provided by the rotor hub. FIG. 3 shows the FIG. 1 type of construction in which the main bearing inner ring supports the planet carrier and the outer ring is secured directly to the nacelle (via the main bearing cover or intermediate housing), and in consequence the axial and bending moment forces exerted by the rotor hub are transferred substantially directly to the nacelle via the main bearing.

The invention claimed is:

1. A gear unit for use in wind turbines, comprising:
an integrated main rotor bearing; and
a planetary gear stage,
said integrated main rotor bearing adapted to provide location for a rotor hub relative to a wind turbine nacelle and adapted to locate a planet carrier relative to a low speed ring gear,
wherein forces due to bending moments acting between the rotor hub and the nacelle are transmitted substantially directly from the rotor hub to the nacelle via the main bearing and substantially none of said bending moments are transmitted to the nacelle via the ring gear of the planetary gear stage.

2. A gear unit according to claim 1 wherein no part of the planet carrier which is substantially in the same axial plane as a plane containing the planet gears transmits any said bending moments to the nacelle.

3. A gear unit according to claim 1 wherein the or each outer ring of the main rotor bearing is secured to the nacelle, and the rotor hub and planet carrier are secured to the inner ring (s) of the main bearing.

4. A gear unit according to claim 1 wherein said main bearing is a double taper roller bearing.

5. A gear unit according to claim 4 wherein said double taper roller bearing comprises two series of taper rollers arranged in an O configuration.

6. A gear unit according to claim 4 wherein said double taper roller bearing comprises a split inner ring.

7. A gear unit according to claim 1 wherein the outer ring (s) of the main bearing is secured substantially directly to the nacelle via a main bearing cover.

8. A gear unit according to claim 1 wherein the main bearing is secured substantially directly to the nacelle via an intermediate housing.

9. A gear unit according to claim 8 wherein said intermediate housing is secured directly to the nacelle or to the outer ring of the main bearing.

10. A gear unit according to claim 1 wherein the planet gears lie axially displaced relative to the main bearing as considered in the direction of the axis about which the planet carrier rotates.

11. A gear unit according to claim 1 wherein the ring gear of the planetary gear stage is selectively releasably secured to the nacelle whereby at least the planet gears and ring gear may be dismounted without the need to remove the rotor.

12. A gear unit according to claim 11 wherein all parts of the gear unit except at least one of the main bearing and the planet carrier or a part thereof may be dismounted without the need to remove the rotor.

13. A gear unit according to claim 11 wherein the planet carrier is of a two part construction comprising one part to support the planet gears, said one part being selectively releasably secured to a second part of the planet carrier which is secured substantially directly relative to the main bearing.

14. A gear unit according to claim 1 wherein the main bearing is provided with a seal pack arranged to be selectively removable in situ from the main bearing.

15. A gear unit according to claim 14 wherein said seal pack is displaceable axially relative to the main bearing.

16. A gear unit according to claim 14 wherein said seal pack comprises a circumferentially discontinuous seal.

* * * * *